(12) United States Patent
Cloarec

(10) Patent No.: US 6,233,950 B1
(45) Date of Patent: May 22, 2001

(54) DEVICE AND PROCESS FOR INJECTING A REFRIGERANT INTO A PRODUCT MIXER

(75) Inventor: Alain Cloarec, Longjumeau (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/357,567

(22) Filed: Jul. 20, 1999

(30) Foreign Application Priority Data

Aug. 5, 1998 (FR) .................................................. 98 10052

(51) Int. Cl.$^7$ .................................................... F25D 25/00
(52) U.S. Cl. ................................... 62/70; 62/52.1; 62/511
(58) Field of Search ............................... 62/70, 52.1, 511, 62/62

(56) References Cited

U.S. PATENT DOCUMENTS

| | | | |
|---|---|---|---|
| 3,273,356 | * 9/1966 | Hoffman | 62/511 |
| 3,672,182 | * 6/1972 | Stowasser et al. | 62/70 |
| 4,406,134 | * 9/1983 | Vakil | 62/511 |
| 4,476,686 | * 10/1984 | Madsen et al. | 62/68 |
| 4,640,099 | * 2/1987 | Gibot | 62/68 |
| 5,104,232 | 4/1992 | Lennox, III . | |
| 5,231,851 | * 8/1993 | Adolfsson | 62/70 |
| 5,261,243 | * 11/1993 | Dunsmore | 62/52.1 |
| 5,603,567 | 2/1997 | Peacock . | |
| 6,079,215 | * 6/2000 | Wisniewski | 62/68 |

FOREIGN PATENT DOCUMENTS

| | | |
|---|---|---|
| 0 166 655 | 1/1986 | (EP) . |
| 0 252 312 | 1/1988 | (EP) . |
| 0 711 511 | 5/1996 | (EP) . |
| 1 416 735 | 2/1966 | (FR) . |
| 1 541 325 | 10/1968 | (FR) . |
| 2 302 479 | 9/1976 | (FR) . |
| 2 532 821 | 3/1984 | (FR) . |

* cited by examiner

Primary Examiner—Ronald Capossela
(74) Attorney, Agent, or Firm—Burns, Doane, Swecker & Mathis, L.L.P.

(57) ABSTRACT

A device for injecting a refrigerant into a product mixer comprising a pipe for injecting the refrigerant comprising (1) an injection nozzle designed to be connected to the mixer and (2) at least one region of reduced cross section suitable for creating an expansion in the fluid located upstream of the injection nozzle with respect to the direction of flow of the fluid in the pipe.

17 Claims, 3 Drawing Sheets

DEVICE AND PROCESS FOR INJECTING A REFRIGERANT INTO A PRODUCT MIXER

BACKGROUND OF THE INVENTION (i) Field of the Invention

The present invention relates to a device for injecting a refrigerant into a product mixer.

Such a mixer, also known as a "churn," equipped with a device for injecting a refrigerant, for example nitrogen, is used especially in the field of the agri-foodstuffs industry for separately deep-freezing each ingredient of ready-cooked dishes or for coating with sauce and simultaneously deep-freezing deep-frozen products.

(ii) Description of Related Art

In the related art, a device for injecting refrigerant into a product mixer generally comprises a pipe for injecting the refrigerant equipped with an injection nozzle intended to be connected to the mixer and with at least one region of reduced cross section suitable for creating an expansion in the fluid. In this type of device, the region of reduced cross section consists of a calibrated orifice positioned at the end of the injection nozzle, at the inlet of the vessel of the mixer. The refrigerant, conventionally consisting of liquid nitrogen, is then injected, via the region of reduced cross section, into the vessel by means of the injection nozzle.

This construction makes it possible to create an expansion in the refrigerant at the inlet of the churn. However, it has a number of drawbacks, especially because of the fact that the calibrated orifice made in the injection nozzle causes a relatively large dispersion of the flow, which adopts a cone shape. It therefore does not allow a stream of liquid nitrogen to be obtained which penetrates deeply into the churn.

SUMMARY OF THE INVENTION

The object of the invention is to alleviate this drawback and to provide a device for injecting refrigerant into a product mixer capable of creating a stream of refrigerant of approximately cylindrical shape and precisely positioned with respect to the inlet of the mixer.

The subject of the invention is therefore an injection device of the aforementioned type, wherein the or each region of reduced cross section is located upstream of the injection nozzle with respect to the direction of flow of fluid in the pipe.

The injection device according to the invention may furthermore comprise one or more of the following characteristics, taken separately or in any technically possible combination;

- it furthermore comprises a liquid and gas phase separator, the separator being located downstream of the or each region of reduced cross section;
- the separator comprises a sharply-bent part of the pipe extending between the at least one region of reduced cross section and the injection nozzle;
- the pipe extends, upstream of the injection nozzle, so as to slope downward toward the latter;
- since the mixer comprises a vessel provided with a rotary blade located near a region for connecting the injection nozzle, the device furthermore comprises a valve which is mounted on the pipe and operated by a control member for injecting the refrigerant cyclically in phase with the rotation of the blade;
- since the injection nozzle is designed to be mounted on a door for access to the vessel, the pipe is fitted with a rotary seal located upstream of the nozzle;
- the rotary seal is located upstream of the separator;
- it furthermore comprises a pressure detector, such as a pressure gauge, mounted on the pipe upstream of the nozzle;
- it furthermore comprises a shutoff valve mounted on one end of the pipe, on the opposite side from the injection nozzle, intended to be connected to a supply of refrigerant under pressure; and
- the refrigerant comprises liquid nitrogen.

With regard to mixers fitted with rotary blades, it will be noted that the vessel can therefore be stationary or else it can also rotate.

Further features and advantages of the invention will emerge from the following description, given solely by way of example, and the drawings, without a limiting character.

DETAILED DESCRIPTION OF PREFERRED EMBODIMENTS

The present application corresponds substantially to French Patent Application 98 10052 filed Aug. 5, 1998, the disclosure of which is hereby incorporated by reference.

Figure 1:
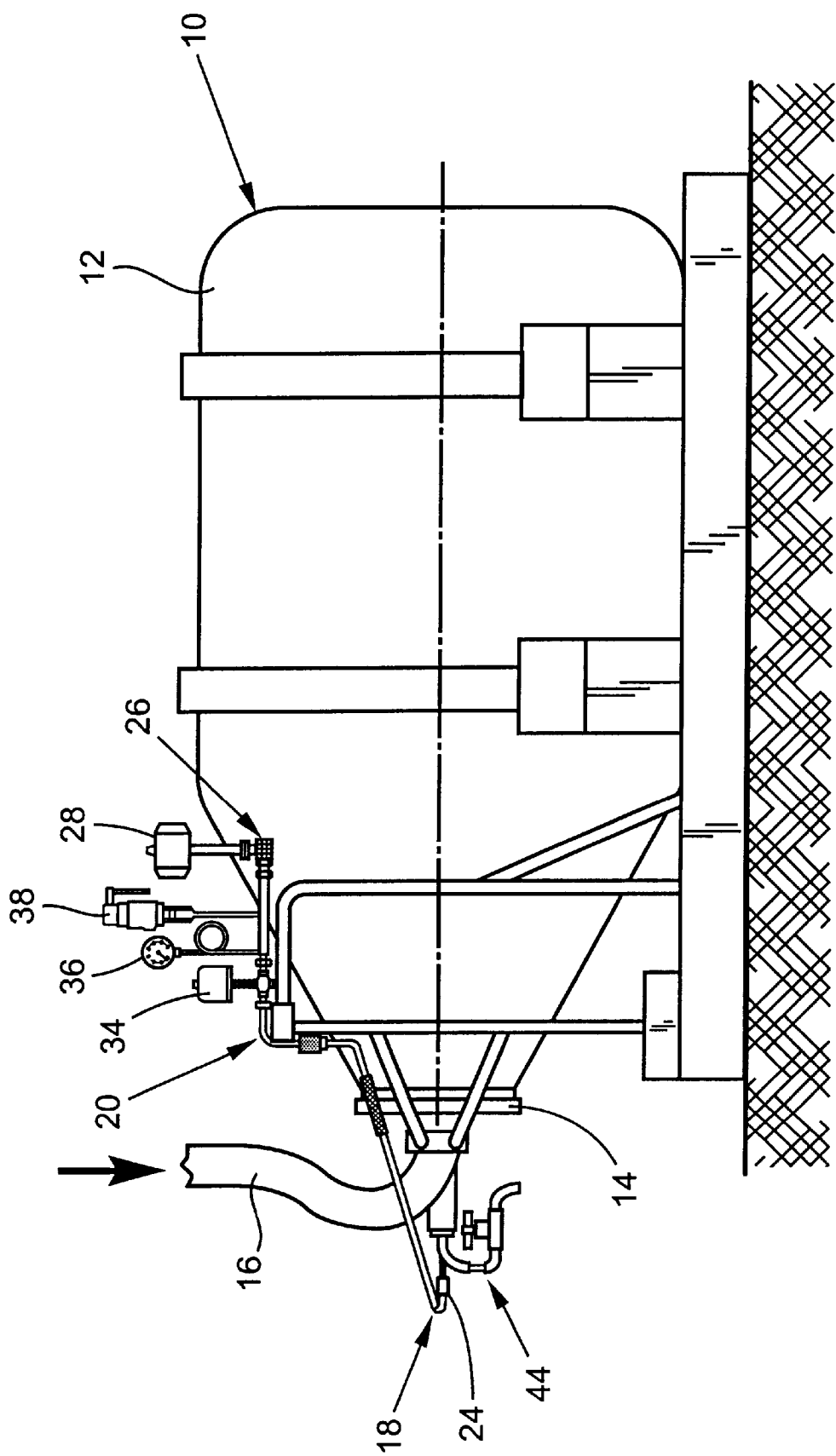
FIG. 1 is a perspective view of a product mixer equipped with an injection device according to the invention.

FIG. 1 illustrates a product mixer denoted by the overall reference number 10.

It is designed to be used in the field of the agri-foodstuffs industry, for example for the preparation of ready-cooked dishes or of vegetable mixtures which are deep-frozen and able to be divided into portions, by the simultaneous mixing, coating with sauce and deep-freezing of deep-frozen products.

Such a mixer is also capable of being used in other fields, for example in the pharmaceutical industry.

The mixer 10 comprises a vessel 12 made of a material suitable for the intended use and equipped with an access door 14 which itself is provided with a pipe 16 for feeding it with product to be prepared.

Moreover, the mixer 10 is provided with a device for injecting a refrigerant, denoted by the overall reference number 18 and illustrated diagrammatically in this figure, designed to allow the mixture contained in the vessel 12 to be deep-frozen.

The injection device 18 is also mounted on the access door 14 and is designed to be connected to a supply (not illustrated) of a refrigerant under pressure, the refrigerant comprising, in the example in question, liquid nitrogen.

Figure 2:
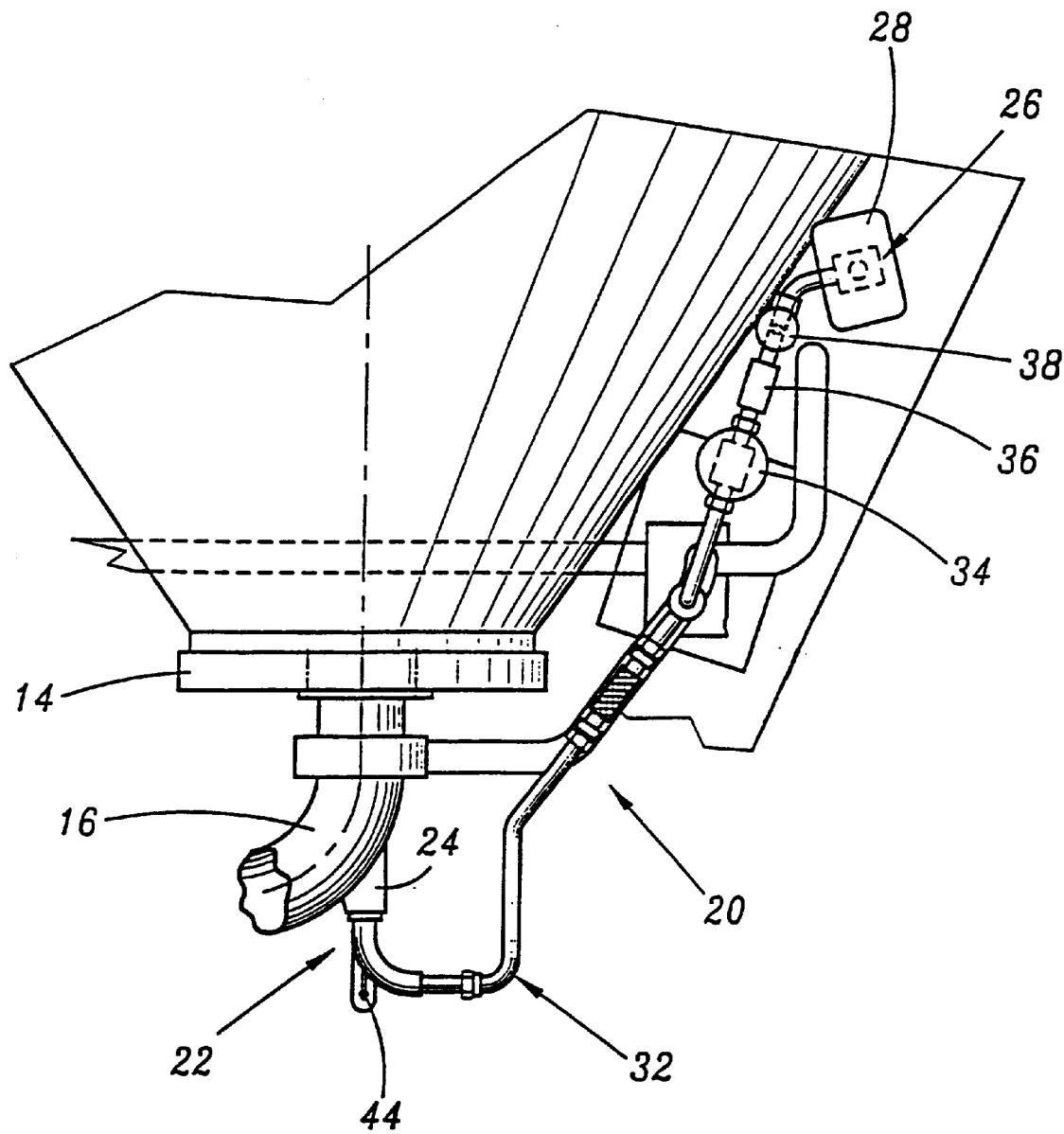
FIG. 2 is a top view of part of the mixer of FIG. 1, showing the refrigerant injection device.
Figure 3:
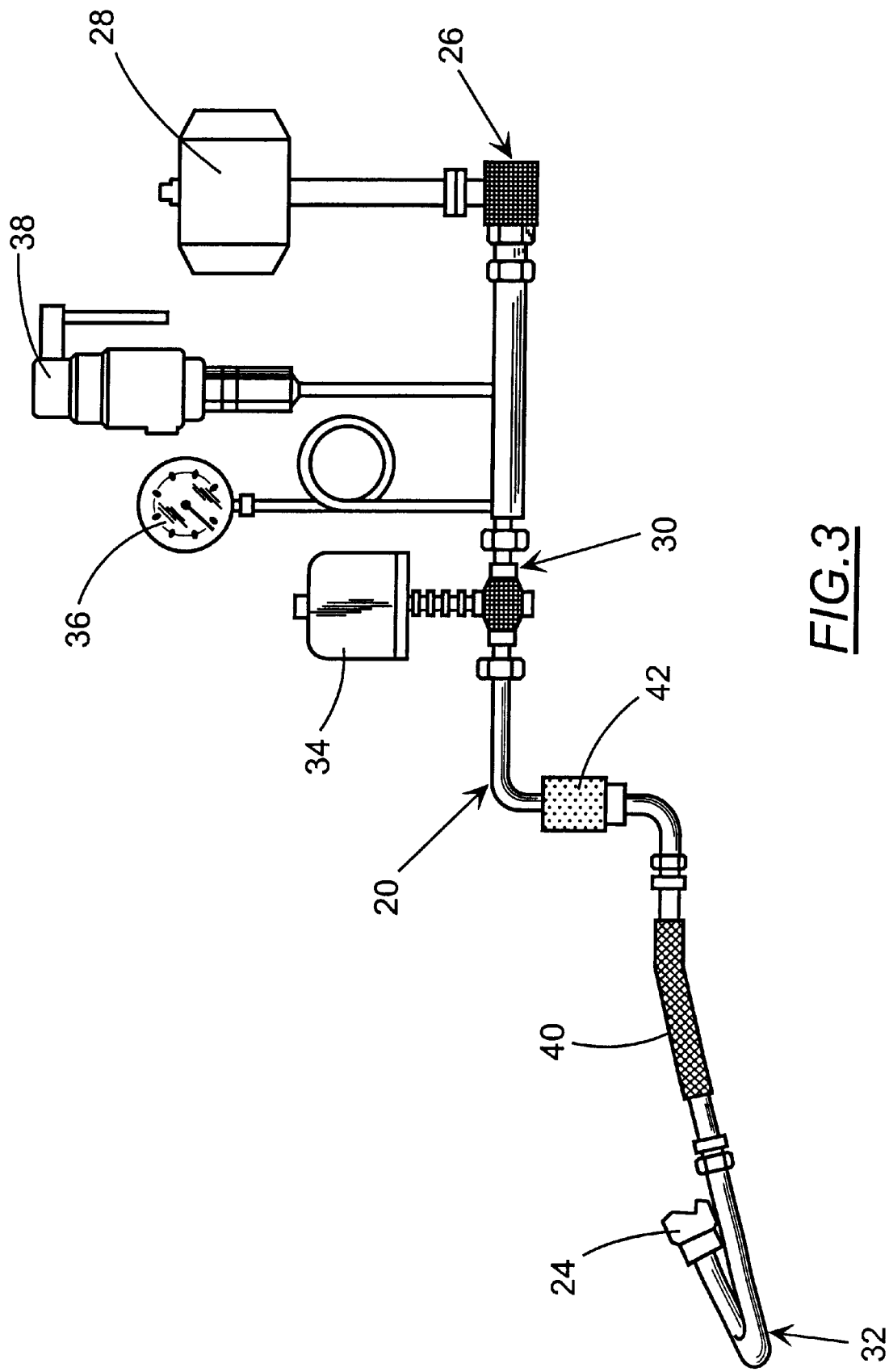
FIG. 3 is a diagram showing the structure of the injection device shown in FIG. 2.

Referring to FIGS. 2 and 3, these show that the liquid-nitrogen injection device mainly comprises a pipe 20, a first end 22 of which is provided with a nitrogen injection nozzle 24 designed to be connected to the door 14 and with an opposite end 26 designed to be connected to the liquid-nitrogen supply via a shutoff valve 28 fitted with an actuator (this valve may, of course, be operated manually or automatically).

The middle part 30 of the pipe is provided with at least one region of reduced cross section suitable for creating an expansion in the liquid nitrogen flowing in the pipe 20.

To do this, the pipe is provided with a calibrated passage provided in this region 30, i.e., placed upstream of the injection nozzle 24 with respect to the direction of flow of the liquid nitrogen.

Moreover, and as may be seen in FIGS. 2 and 3, the pipe 20 has a sharply-bent part 32 extending between the injection nozzle 24 and the region 30 of reduced cross section so as to effect a natural separation of the nitrogen liquid and gas phases, downstream of the calibrated orifice 30, by the action of the centrifugal force being exerted on the nitrogen in the sharply-bent part. This thus creates a stream of liquid flowing in the external part of the sharp bend, while the gas phase, created due to the effect of the fluid passing through the calibrated orifice, flows in the internal part of the sharp bend 32.

FIGS. 2 and 3 also show that the pipe 20 is furthermore provided with a solenoid valve 34 operated by a member for controlling its operation (not illustrated), the member being suitable for controlling the flow rate in the pipe 20 in a "flow on/flow off" manner, this solenoid valve being located downstream of the calibrated orifice 30.

Since the injection nozzle 24 is located in the immediate vicinity of the rotary blade with which the vessel 12 is conventionally equipped, at the inlet of the latter, the member for controlling the operation of the electrovane 34 opens and closes the latter in a cyclic manner in phase with the rotation of the blade so as to inject the liquid nitrogen into the vessel when the blade lies in a position offset with respect to the nozzle 24.

This thus avoids any risk of injecting liquid nitrogen onto the blade, but also the risk of injecting the liquid nitrogen onto the product which has been shed by the blade in front of the inlet of the vessel, which would cause mediocre cooling of the mixture contained in the vessel 12 because of a relatively large temperature gradient being created in the latter.

With the purpose of providing a precise indication of the pressure of the liquid nitrogen contained in the pipe 20, a pressure gage 36 is placed upstream of the solenoid valve 34 and particularly upstream of the calibrated orifice 30 so as to provide a relatively constant indication of the value of the pressure (total pressure) whatever the operating cycle of the solenoid valve 34.

FIGS. 2 and 3 also show that a valve 38 is provided upstream of the pressure gage 36.

Referring again to FIG. 2, this shows that the assembly formed by the product feed pipe 16 and the associated injection nozzle 24 at the corresponding end of the pipe 20 is mounted on the door 14 of the vessel 12.

In order to allow the door to be opened easily, the pipe 20 is provided with a conventional rotary-type seal 42 and with a hose 40 which together allow the pipe to move with at least two degrees of freedom.

FIG. 3 shows that the region of the pipe extending upstream of the injection nozzle 24, preferably as far as the hose 40, adopts a configuration in the form a gentle slope toward the nozzle so as to prevent any retention of nitrogen in this part and to allow a cleaning liquid to be easily drained.

Preferably, the pipe in this region makes an angel of 15° with respect to the horizontal.

Finally, FIG. 2 shows that the pipe 20 has a vacuum tap 44 allowing, as is conventional, the ambient air filling the vessel 12 to be evacuated.

It will be realized that the adopted configuration that has just been described, which uses a pipe provided with a calibrated orifice upstream of the injection nozzle and downstream of which a sharply-bent region is provided, makes it possible, on the one hand, to create the expansion upstream of the injection region, thereby avoiding the creation of a divergent flow of liquid nitrogen at the inlet of the churn, and, on the other hand, to separate naturally, i.e., mechanically, in the sharply-bend part, the liquid phase from the gas phase created at the output of the calibrated orifice, which allows a clearly defined, i.e., undispersed, stream of liquid to be injected at the inlet of the vessel, thus allowing the center of the vessel to be reached effectively and allowing the liquid nitrogen to be injected relatively deeply into the latter.

It should moreover be noted that the invention is not limited to the embodiment described.

Thus, the injection device described with reference to FIGS. 2 and 3 has a calibrated orifice located upstream of a solenoid valve for controlling a nitrogen injection. However, it would be conceivable, as a variant, for these two elements to be made as one piece, using a valve of suitable internal diameter allowing an expansion to be created.

What is claimed is:

1. A product mixer, comprising:
a device for injecting a refrigerant therein, the device comprising a pipe having at least one region of reduced cross section suitable for creating an expansion of the refrigerant and an injection nozzle at one end of the pipe connected to the mixer, the at least one region of reduced cross section being located upstream of the injection nozzle with respect to the direction of flow of the refrigerant in the pipe.

2. The product mixer according to claim 1, wherein the device further comprises a gas/liquid separator located downstream of the at least one region of reduced cross section for separating liquid and gas phases of the refrigerant.

3. The product mixer according to claim 2, wherein said separator comprises a sharply-bent part of the pipe, located between said at least one region of reduced cross section and said injection nozzle.

4. The product mixer according to claim 1, wherein said pipe upstream of said injection nozzle slopes downwardly toward the injection nozzle.

5. The product mixer according to claim 1, wherein said mixer further comprises a vessel comprising a rotary blade, located near a region at which said injection nozzle is connected to said mixer.

6. The product mixer according to claim 5, wherein the device further comprises a valve mounted on said pipe and operated by a control member for injecting the refrigerant cyclically in phase with rotation of the blade.

7. The product mixer according to claim 6, further comprising a door for access to said vessel, wherein said injection nozzle is mounted on the door and wherein the pipe is fitted with a rotary seal upstream of said injection nozzle.

8. The product mixer according to claim 7, wherein the device further comprises a gas/liquid separator located downstream of the at least one region of reduced cross section for separating liquid and gas phases of the refrigerant, wherein said rotary seal is located upstream of the separator.

9. The product mixer according to claim 6, wherein the device further comprises a pressure detector mounted on the pipe upstream of the valve.

10. The product mixer according to claim 1, wherein the device further comprises a shutoff valve mounted on one end of the pipe on a side opposite to that of the injection nozzle and a supply of refrigerant under pressure, wherein said shutoff valve is connected to said supply.

11. The product mixer according to claim 1, wherein the refrigerant comprises liquid nitrogen.

12. A process for injecting a refrigerant into a product mixer including a vessel comprising the steps of:
   (i) feeding said refrigerant into a pipe comprising at least one region of reduced cross section suitable for creating an expansion of said refrigerant and an injection nozzle at one end of the pipe connected to said mixer, wherein said region of reduced cross section is upstream of said injection nozzle with respect to the direction of refrigerant flow;
   (ii) expanding said refrigerant in said at least one region of reduced cross section; and
   (iii) injecting the refrigerant through said injection nozzle into the mixer.

13. The process according to claim 12, further comprising the step of separating said fluid into liquid and gas phases at a point downstream of said region of the pipe where the expansion in the fluid takes place, so as to inject a substantially clearly defined stream of liquid into the vessel.

14. The process according to claim 13, wherein said separating step comprises directing said refrigerant flow, downstream of said region of the pipe where the expansion in the refrigerant takes place, in a sharply-bent part of the pipe capable of causing mechanical separation of the phases by a centrifugal effect.

15. The process according to claim 12, wherein said step of injecting said refrigerant into said mixer further comprises injecting said refrigerant cyclically into the vessel in phase with a rotary blade located near a region for connection of the injection nozzle.

16. The process according to claim 12, wherein said refrigerant comprises liquid nitrogen.

17. A product mixer, comprising:
   a device for injecting a refrigerant comprising a liquid phase and a gas phase into the mixer, the device comprising a pipe having at least one region of reduced cross section suitable for creating an expansion of the refrigerant and an injection nozzle at one end of the pipe connected to the mixer, the at least one region of reduced cross section being located upstream of the injection nozzle with respect to he direction of flow of the refrigerant in the pipe; and
   a gas/liquid separator located between said at least one region of reduced cross section and said injection nozzle for separating the liquid and gas phases, said gas/liquid separator comprising a sharply-bent part of the pipe.

* * * * *